US008436840B2

(12) United States Patent
Ahluwalia

(10) Patent No.: US 8,436,840 B2
(45) Date of Patent: May 7, 2013

(54) DEVICES AND METHODS FOR IMPROVING LCD DEVICE TESTING

(75) Inventor: Inderpreet Singh Ahluwalia, Austin, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 1161 days.

(21) Appl. No.: 12/334,362

(22) Filed: Dec. 12, 2008

(65) Prior Publication Data

US 2010/0153046 A1 Jun. 17, 2010

(51) Int. Cl.
*G06F 3/038* (2006.01)

(52) U.S. Cl.
USPC ............................ 345/204; 345/102; 345/2.1

(58) Field of Classification Search ........................ None
See application file for complete search history.

(56) References Cited

U.S. PATENT DOCUMENTS 6,119,023 A * 9/2000 Tomiyori ..................... 455/574

* cited by examiner

*Primary Examiner* — Muhammad N Edun
(74) *Attorney, Agent, or Firm* — Hartman & Citrin LLC

(57) ABSTRACT

Disclosed are devices and methods that relate to an LCD device responding to an AT command that solely activates the backlight of the LCD device. An LCD device is programmed to respond to two distinct backlight AT commands. One AT command turns the backlight on, and another AT command turns the backlight off. These backlight AT commands are programmed into LCD device testing equipment so that accurate photographs are taken of the LCD device, and results are improved. The backlight AT commands are also used as part of the programming for user-end applications.

17 Claims, 4 Drawing Sheets

DEVICES AND METHODS FOR IMPROVING LCD DEVICE TESTING

BACKGROUND OF THE INVENTION

1. Field of the Invention

The present invention relates to the improvement of the testing of devices having LCD screens. More specifically, the present invention relates to the testing feedback and battery conservation of LCD devices using AT commands.

2. Background of the Invention

Today there are many electronic devices that utilize a Liquid Crystal Display (LCD). An LCD is a relatively flat display device made up of any number of color or monochrome pixels arrayed in front of a light source or reflector. LCD's are often used in small electronic devices because of their light weight and low power consumption.

Although an LCD uses relatively little battery power, today's market demands batteries that last longer and longer. While battery manufacturers are trying to increase the power a battery can hold, device and software designers are trying to decrease the amount of power consumed. It is recognized that the backlight of an LCD consumes approximately two-thirds of the total power consumed by the LCD. However, the backlight is necessary for most devices, especially if employing a color LCD. In response, software designers try to keep the backlight off when not in use. Many have a variable setting for how long the device may idle before turning off the backlight, but it is usually somewhere between 5 and 30 seconds.

Cellular telephones, Personal Digital Assistants (PDAs), Global Positioning System (GPS) units, universal remote controllers, MP3 players, digital cameras, etc. all undergo routine testing to make sure they work before being released for sale. During testing, these devices are connected to computer systems that command the devices to perform certain tasks. The commands the computer gives are part of a set of commands that tell the device what to do at certain times and under certain conditions. These commands are implemented in such ways as through software, through the device's hardware by a user input, etc. The commands may also control the device's other software in a specific manner. These commands are known as AT commands. AT is a mnemonic code for ATtention. Some AT commands control the keypad or buttons while others control the hardware itself, such as an onboard modem.

For instance if the manufacturer wanted to test a cellular telephone to see how well it responded to a command to connect to the network, the manufacturer would send an AT command telling the cellular telephone to connect. The manufacturer could also send a string of AT commands simulating the order of hardware button pushes to connect to the network. The manufacturer could do this either way, and probably both just to make sure both ways work. After the computer has run the command or set of commands, it takes a picture of the screen of the cellular phone. This is to save the results and ensure a working cellular telephone. However, due to the manufacturer's interest in preserving the battery by turning the backlight off when the cellular telephone is in an idle state, the backlight can turn off before the picture is taken. This results in a picture that is too dim to tell if the results are positive or negative.

To avoid this scenario the testing equipment for these LCD devices has a pneumatic "finger" that can physically press a button on the device. The button can be the directional pad, a scroll button, etc. Sometimes the mere press of a direction or scroll wheel does not change the image on the screen, but this is not always the case. If the button does cause the screen to change then the results cannot be trusted.

Currently there does not exist an LCD device with a button having the sole function of turning on the backlight. There is also no AT command for an LCD device that solely turns on the backlight. What is needed in the art is an AT commmand that turns the backlight on without any other function. With such an AT command, LCD device testing can be improved. Such an AT command could be executed just before a picture of the LCD device is taken for testing, resulting in a clear unadulterated image of the screen.

SUMMARY OF THE INVENTION

The present invention includes devices and methods for an LCD device to respond to an AT command that solely activates the backlight of the LCD device. An LCD device is programmed to respond to two distinct backlight AT commands. One AT command turns the backlight on, and another AT command turns the backlight off. These backlight AT commands are programmed into LCD device testing equipment so that accurate photographs are taken of the LCD device, and results are improved. The backlight AT commands are also used as part of the programming for user-end applications.

In one embodiment, the present invention is an LCD device, including a housing, a processor within the housing, a memory within the housing and in communication with the processor, a liquid crystal display coupled to the housing and in communication with the processor and memory, and a logic on the memory that responds to a plurality of AT commands. The logic responds to a backlight AT command that does nothing more than turn the backlight of the LCD one of on and off.

In another embodiment, the present invention is a method of testing a device having an LCD. The method can include executing a string of AT commands on the device, executing a backlight AT command that does nothing more than turn a backlight of the LCD on, and photographing an image on the LCD.

In yet another embodiment, the present invention is a method of LCD device testing of the type requiring execution of a string of AT commands. The method can include executing a backlight AT command. The backlight AT command does nothing more than turn on a backlight of an LCD on the device just before a photograph of the LCD is taken.

DETAILED DESCRIPTION OF THE INVENTION

The present invention includes devices and methods for an LCD device to respond to an AT command that solely activates the backlight of the LCD device. An LCD device is programmed to respond to two distinct backlight AT commands. One AT command turns the backlight on, and another AT command turns the backlight off. These backlight AT commands are programmed into LCD device testing equipment so that accurate photographs are taken of the LCD device, and results are improved. The backlight AT commands are also used as part of the programming for user-end applications.

"LCD device," as used herein and throughout this disclosure, refers to any electronic device having an output in the form of a liquid crystal display. Examples of LCD devices include cellular telephones, PDAs, MP3 players, digital cameras, etc.

"AT command," as used herein and throughout this disclosure, refers to a command, normally part of a set of commands, that a device is programmed to respond to in a certain way. An AT command is similar to a terminal or shell command for a computer. Examples of AT commands include "at" (get attention), "at+csq" (get signal quality), "at+cbc" (get battery charge), "at+cpin?" (check if pin is verified), "at+creg?" (check network registration), etc. Some AT commands are universal while others are manufacturer or device specific. AT commands can be used from a terminal or shell prompt or as part of a software program.

Figure 1A:
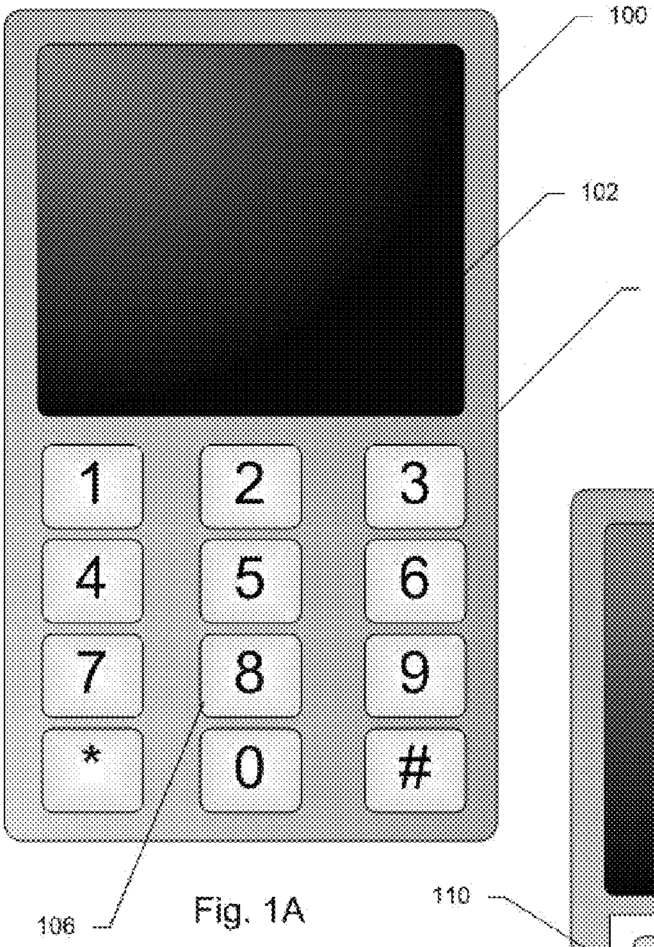
FIGS. 1A and 1B show an LCD device, according to an exemplary embodiment of the present invention.
Figure 1B:
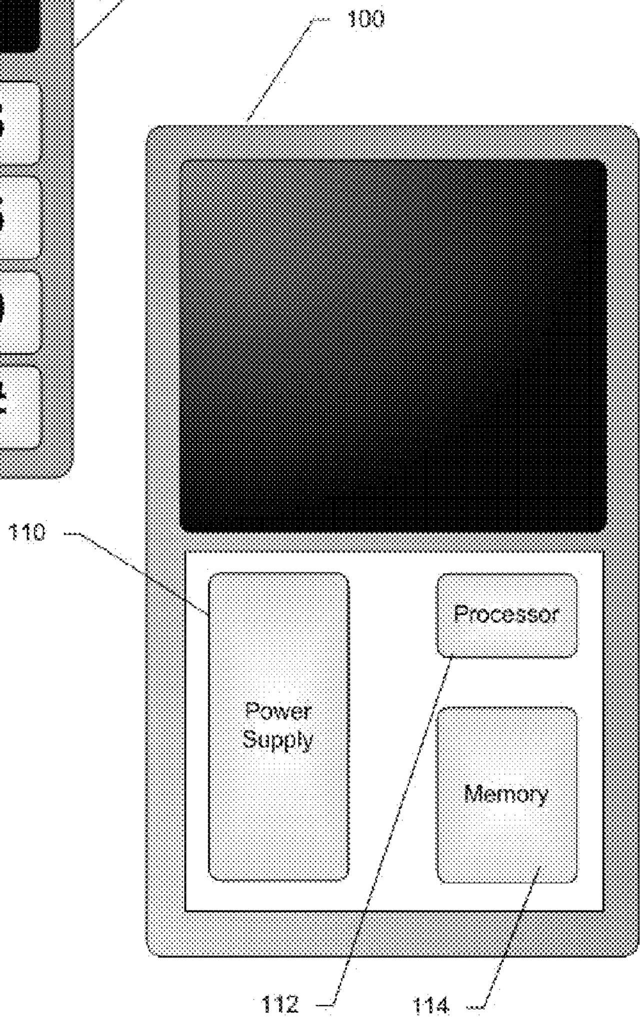

An exemplary embodiment of an LCD device 100, shown in FIGS. 1A and 1B, includes a housing 104, an LCD 102, a user input 106, a power supply 110, a memory 114, and a processor 112. Housing 104, LCD 102, and user input 106 forms the exterior of LCD device 100. Housing 104 is preferably made from a lightweight material such as plastic. LCD 102 is a color liquid crystal display with a backlight. User input 106 comprises a keypad where a user can press a button or combination of buttons to achieve a desired result on LCD device 100. LCD 102, user input 106, processor 112, and memory 114 are connected to power supply 110. Power supply 110 provides power to LCD device 100. Memory 114 stores an operating system for LCD device 100. The operating system is programmed to respond to an event involving user input 106 as well as a plurality of AT commands. Among the plurality of AT commands are two backlight AT commands that, when executed, do nothing more than turn the backlight of LCD 102 on or off. Processor 112 is in communication with memory 114 and runs the operating system. Processor 112 is responsible for executing any AT commands that are input.

LCD devices such as the device featured in FIGS. 1A and 1B are substantially designed for mass production. Many steps may go into the mass production of LCD devices, and device testing is a significant step. When it comes to testing the functionality of an LCD device, a string of commands is input and the LCD device executes the string. The string can be a simple or complex chain of commands telling the device to go to a website, play a specific song file, dial a specific phone number, etc. At the rate these LCD devices are tested, an immediate human check is inefficient. A camera takes a picture of the LCD device screen as a check to make sure the LCD device executed the string correctly. These images are stored in a database for later viewing. A sample of a desired image is also stored in the database. At any time after the testing is done and the picture is taken, a check can initiate. The check can be done by a human, or, through image recognition software, a computer. If the picture taken of the LCD device matches the picture of the desired image, then it is assumed that the device has executed the string correctly. If the picture taken of the LCD device does not match the desired image, then it is assumed that the device has not executed the string correctly.

Figure 2A:
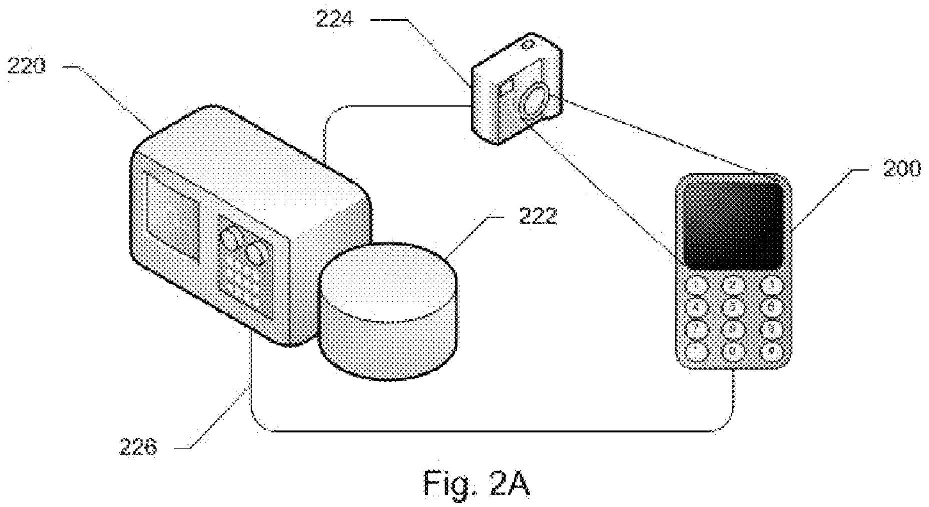
FIG. 2A shows the testing of a single LCD device 200, according to an exemplary embodiment of the present invention.

FIG. 2A shows the testing of a single LCD device 200, according to an exemplary embodiment of the present invention. In this embodiment, a computer 220 is in communication with a database 222, a camera 224, and an LCD device 200. Computer 220 allows a user to input commands for a testing sequence. These commands are in the form of AT commands. These commands are stored on database 222 such that they can be executed at a specified time. Camera 224 is utilized to take a picture of the display screen of LCD device 200. Because a clear picture is desired, computer 220 sends an AT command to LCD device 200 to turn on the backlight before a picture is taken. This backlight AT command is communicated to LCD device 200 through a cable 226. In alternative embodiments, the AT commands are sent wirelessly to LCD device 200. After camera 224 takes the picture, the picture is sent to database 222 and stored for comparison. Additionally, computer 220 sends an AT command to LCD device 200 to turn off the backlight.

Figure 2B:
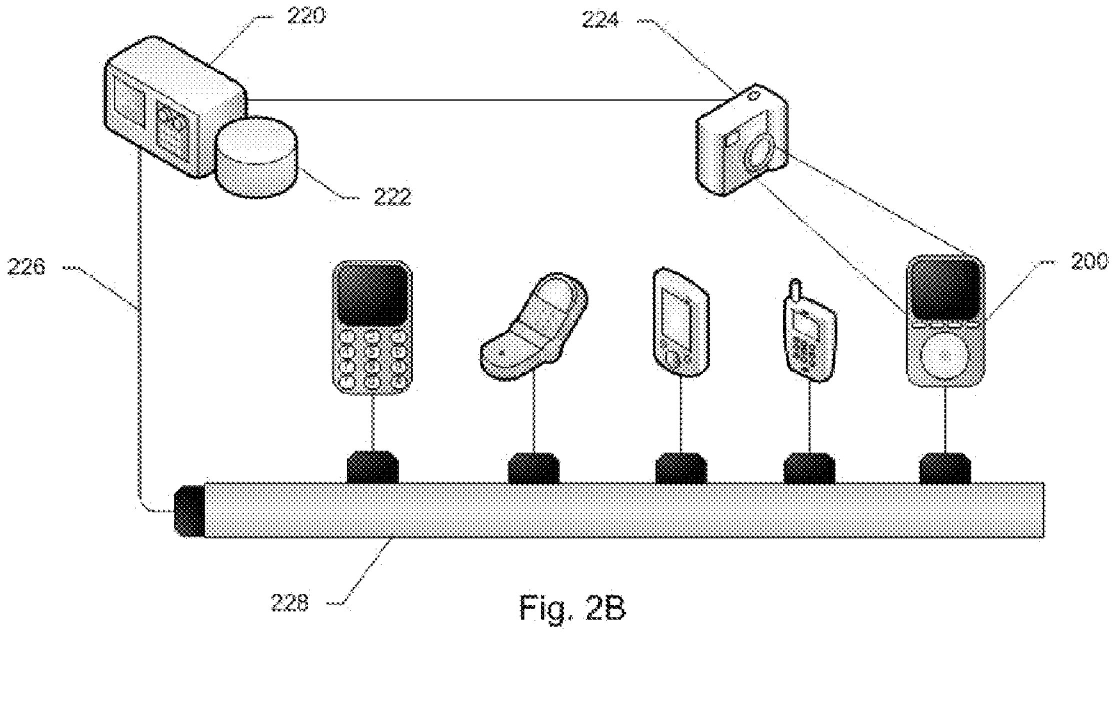
FIG. 2B shows testing of multiple LCD devices, according to an exemplary embodiment of the present invention.

FIG. 2B shows testing of multiple LCD devices, according to an exemplary embodiment of the present invention. In this embodiment, multiple LCD devices, including an LCD device 200 are coupled to a hub 228 that is in communication with a computer 220. Computer 220 is additionally in communication with a database 222 and a camera 224. A user, or a program contained in database 222, controls camera 224 and LCD devices 200. Computer 220 communicates these AT commands to hub 228 that communicates with each of the LCD devices 200, including LCD device 200. Computer 220 sends AT commands to LCD device 200 using either a wired or wireless connection. Computer 220 sends an AT command to LCD device 200 to turn on LCD device 200's backlight. With the backlight of LCD device 200 on, camera 224 takes a picture. Camera 224 is aligned such that it takes a picture of the display of LCD device 200. The picture is sent to computer 220 and stored in database 222. After the picture is taken, computer 220 sends an AT command to LCD device 200 to turn off the backlight. After taking a picture of LCD device 200, camera 224 moves to take a picture of a next LCD device 200. Camera 224 may be coupled to a track, allowing it to move its location to a location complimentary to the next LCD device 200. Alternatively, camera 224 may be fixed and the LCD devices 200 are moved such that the next LCD device 200 is positioned under the camera. This could be accomplished in many ways, including the use of a conveyor belt.

The computer 220 in the LCD device testing equipment shown in FIGS. 2A and 2B controls the testing procedure. The computer 220 is responsible for initiating the testing, inputting the command string, activating the camera, etc. The computer 220 is connected to each LCD device 200 and can input a command string at any time the LCD device 200 and the computer 220 are connected. With a single camera the pictures can get backed up on the testing line as in FIG. 2B. When a backup happens is when the backlight AT command comes into play. The computer 220 can input a command string to the LCD device 200 when the LCD device 200 has free resources. Just before the picture is taken the computer 220 inputs the backlight AT command, which turns the backlight of the LCD device 200 on. Therefore, each LCD device 200 can execute its command much longer before the camera takes its picture than the backlight time-out occurs. The computer 220 may also have image comparison software onboard. The image comparison software compares the pictures of the tested LCD devices 200 with the accepted desired image. If the images match, the computer 220 assumes the string has been executed correctly, and the LCD device 200 is kept. If the images do not match, the computer 220 assumes the string has been executed incorrectly, and the LCD device 200 is either repaired or disposed.

Figure 3:
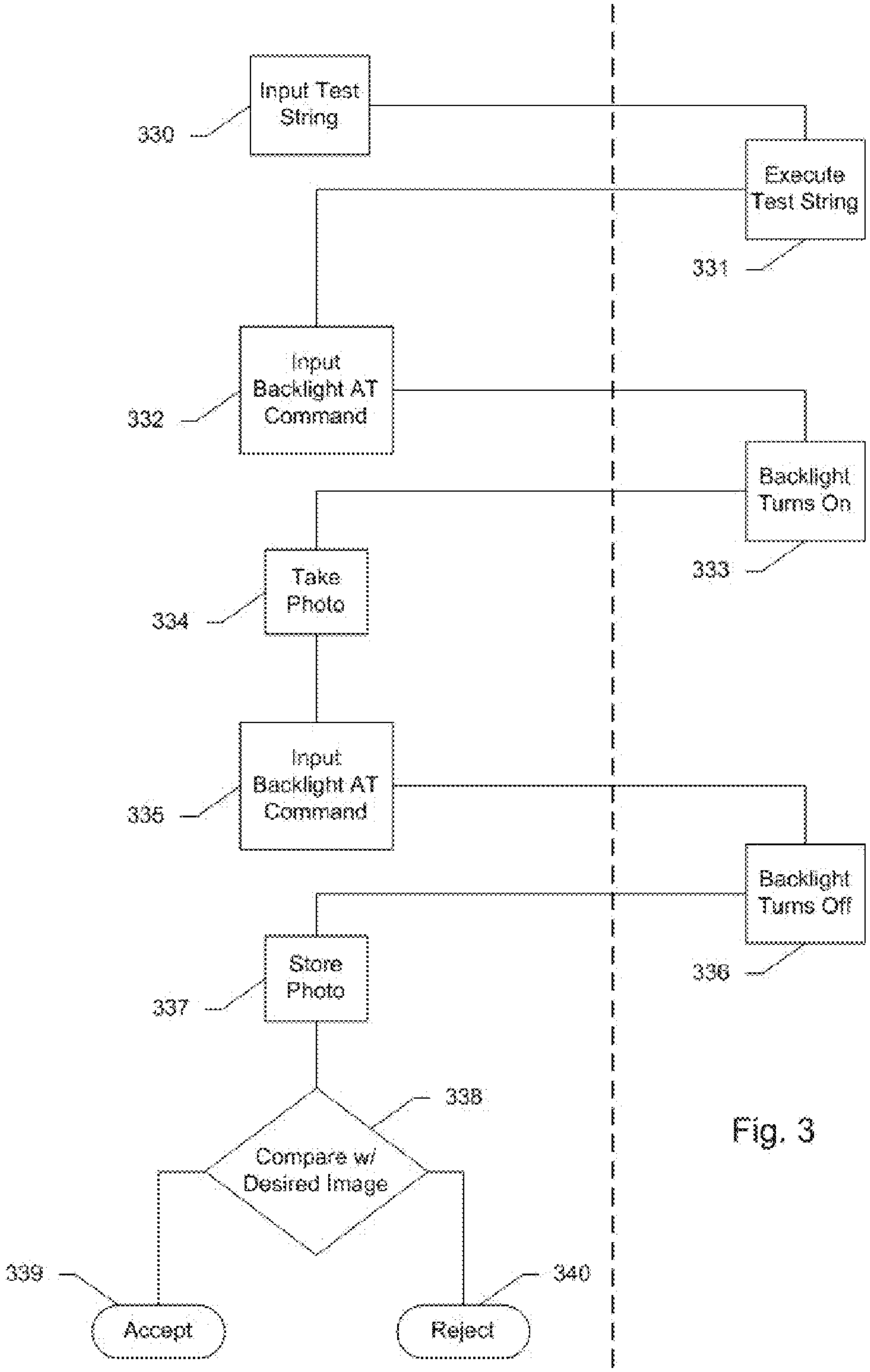
FIG. 3 shows a flowchart of a method of testing an LCD device, according to an exemplary embodiment of the present invention.

FIG. 3 shows a flowchart of a method of testing an LCD device, according to an exemplary embodiment of the present invention. The method begins when a user inputs a test string 330 on a computer 220 or other input device. The inputting may be the user typing in each of the commands, sending stored commands, a program sending stored commands, etc. This test string is comprised of AT commands sent to the LCD device 200. The test string is received by the LCD device that executes the test string 331. Once the LCD device 200 has executed the test string, the user or a program inputs a backlight AT command 332 into the computer 220 or input device. This command is received by the LCD device 200, which then turns on its backlight 333. With the backlight of the LCD device 200 on, the camera takes a picture 334 of the display of the LCD device 200. The taking of the picture is automated. After the picture has been taken, a backlight AT command is sent 335 in order to turn off the backlight of the LCD device 200. When the LCD device 200 receives the command, the backlight is turned off 336. The picture taken of the display of the LCD device is stored 337 by the computer 220. Stored pictures of the display as well as displays of other LCD devices 200 are compared with desired images 338 of what the LCD device 200 should show. LCD devices 200 for which pictures of the display match the desired image are accepted 339 while those LCD devices 200 for which picture of the display do not match the desired image are rejected.

Embodiments of the backlight AT command have many uses outside of testing LCD devices 200. AT commands in general can be used as part of the programming behind many user-end applications. User-end applications make use of two distinct backlight AT commands. One command turns the backlight on, and another command turns the backlight off. These user-end applications use the backlight AT commands to conserve battery. Some applications require a period of calculation. A user may enter a few numbers of fill in a few fields, then wait while the processor calculates the result or looks up the answer. Some of these applications need to reference the internet or some other networked device or database in order to retrieve the answer. This retrieval may take time depending on the connection speed that may depend on the signal quality. Instead of using the backlight to illuminate the same screen while this processes, a screen that the user cannot or should not interact with, the application is programmed to turn off the backlight. The backlight remains off during the entire process until an answer is calculated or retrieved. Once the answer is calculated or retrieved, the answer is displayed before the user and the application turns that backlight on. Uses of the backlight AT commands are not restricted to battery conservation although it may be a prevalent use for them. Games are programmed to turn off the backlight during loading times. Other games that are memory challenges may display an image just before the backlight is turned off while the player's memory is then tested. Many other uses for the backlight AT commands in programming applications and games are readily apparent to one skilled in the art.

Figure 4:
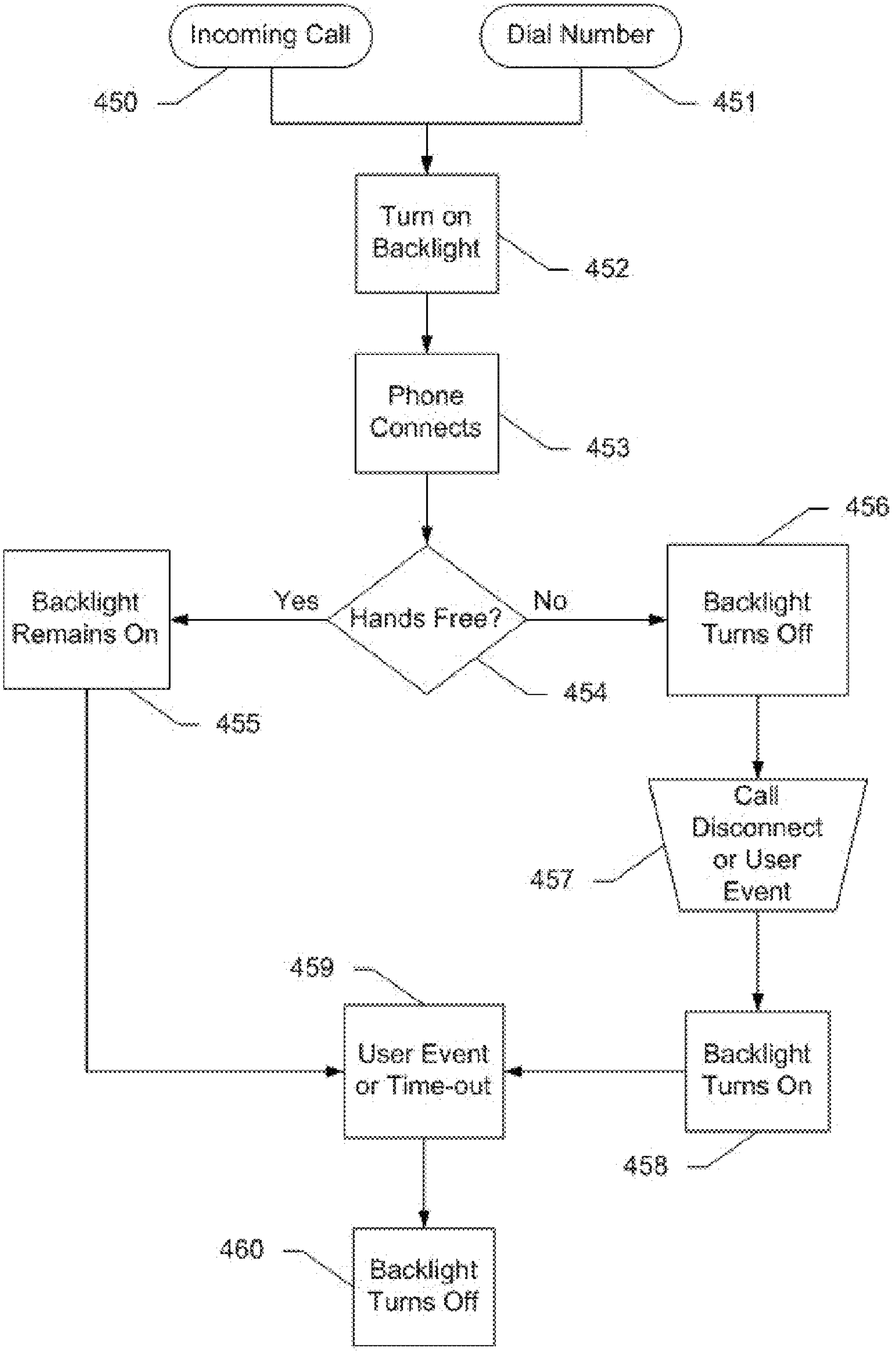
FIG. 4 shows a method of use of a backlight AT command for a user-end application which turns the backlight off during a phone call, according to an exemplary embodiment of the present invention.

FIG. 4 shows a method of use of a backlight AT command for a user-end application that turns the backlight off during a phone call, according to an exemplary embodiment of the present invention. The method begins with either an incoming call 450 or a number being dialed 451 by a user. Either of these actions turns on the backlight 452 of an LCD device 200. The backlight turns on by running an AT command from the memory on the processor of the phone. Alternatively, the AT command may be sent along with the incoming call. After the user has selected to answer an incoming call 450 or dial a number 451, the phone connects 453. When the phone connects 453, the phone determines whether a hands-free device is being utilized 454. An example of a hands-free device is a BLUETOOTH headset. If a hands-free device is not being used, the memory and processor of the phone run an AT command and the backlight turns off 456. The backlight remains off until the call disconnects or a user event occurs 457. This event may be the user pushing a button. After the disconnect or user event, the backlight turns on 458. This is again accomplished by running an AT command. The backlight remains on until a user event or a specified amount of time has lapsed 459 and then turns off 460 through the use of an AT command. If the phone determines that a hands-free device is being used, the backlight remains on 455. This allows a user to utilize other features of the phone. A user event or lapse of time 459 causes an AT command to run and turn off the backlight 460.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An LCD device comprising:

a housing;

a processor within the housing;

a memory within the housing and in communication with the processor;

a liquid crystal display coupled to the housing and in communication with the processor and memory; and a logic on the memory which responds to a plurality of AT commands; wherein the plurality of AT commands is associated with a desired image;

wherein the logic responds to a backlight AT command which does nothing more than turn the backlight of the LCD one of on and off.

2. The device in claim 1, wherein the device is one of a cellular telephone, PDA, MP3 player, and digital camera.

3. The device in claim 1, wherein the device connects to a computer which inputs a plurality of AT commands.

4. The device in claim 3, wherein the computer inputs the plurality of AT commands wirelessly.

5. The device in claim 1, wherein a user-end application resides on the memory, the user-end application utilizing the backlight AT command.

6. A method of testing a device having an LCD comprising:

executing a string of AT commands on the device; wherein the string of AT commands is associated with a desired image;

executing a backlight AT command which does nothing more than turn a backlight of the LCD on; and photographing an image on the LCD.

7. The method in claim 6, wherein a computer inputs the string of AT commands to the LCD device.

8. The method in claim 6, further comprising executing a backlight AT command which does nothing more than turn the backlight of the LCD off.

9. The method in claim 6, further comprising comparing a photograph of the image on the LCD with the desired image.

10. The method in claim 9, further comprising accepting the LCD device when the LCD image matches the desired image.

11. The method in claim 9, further comprising rejecting the LCD device when the LCD image does not match the desired image.

12. A method of LCD device testing of the type requiring execution of a string of AT commands comprising:

executing a backlight AT command;

wherein the backlight AT command does nothing more than turn on a backlight of an LCD on the device just before a photograph of the LCD is taken; and wherein the string of AT commands is associated with a desired image.

13. The method in claim 12, wherein a computer inputs the string of AT commands to the LCD device.

14. The method in claim 12, further comprising executing a backlight AT command which does nothing more than turn the backlight of the LCD off.

15. The method in claim 12, further comprising comparing the photograph of the LCD with a desired image.

16. The method in claim 15, further comprising accepting the LCD device when the LCD image matches the desired image.

17. The method in claim 15, further comprising rejecting the LCD device when the LCD image does not match the desired image.

* * * * *